INVENTORS
Kiyokata Matsuura
Katsumi Takami
By Paul M. Craig Jr.
ATTORNEY

INVENTORS
Kiyokata Matsuura
Katsumi Takami
By Paul M. Craig Jr.
ATTORNEY

Feb. 14, 1967 KIYOKATA MATSUURA ETAL 3,303,701
NON-CONTACT TEMPERATURE MEASUREMENT SYSTEM
Filed March 25, 1963 8 Sheets-Sheet 5

INVENTORS
Kiyokata Matsuura
Katsumi Takami
By Paul M. Craig, Jr.
ATTORNEY

INVENTORS
Kiyokata Matsuura
Katsumi Takami

By Paul M. Craig Jr.
ATTORNEY

INVENTORS
Kiyokata Matsuura
Katsumi Takami
By Paul M. Craig, Jr.
ATTORNEY

United States Patent Office 3,303,701
Patented Feb. 14, 1967

3,303,701
NON-CONTACT TEMPERATURE MEASUREMENT SYSTEM
Kiyokata Matsuura, Nagoya, and Katsumi Takami, Tokyo, Japan, assignors to Hitachi, Ltd., Tokyo, Japan, a corporation of Japan
Filed Mar. 25, 1963, Ser. No. 267,501
Claims priority, application Japan, Mar. 27, 1962, 37/11,209; May 8, 1962, 37/18,829; June 15, 1962, 37/31,272; 37/31,273; Oct. 9, 1962, 37/43,579, 37/43,580, 37/43,581; Feb. 4, 1963, 38/4,495
16 Claims. (Cl. 73—351)

The present invention relates generally to temperature measurement particularly of rotating objects and is intended to provide a novel non-contact temperature measurement system adapted to determine the temperature of any desired portion of a machine component and particularly of the rotor of various forms of rotary machine from the stator side thereof by use of an extremely simple resonance circuit.

Heretofore, temperature measurement of the rotor of a rotary machine such as a generator or a motor has required a rather complicated and troublesome measuring system. In one system, a transmitter with a built-in power supply source is mounted on the rotor and the oscillation frequency of the transmitter is determined which depends upon the rotor temperature to be measured. In another system, a temperature-sensitive resistor such as a thermistor is secured to the rotor and the variation in resistance of the thermistor, which varies with the rotor temperature, is determined on the stator side. The use of a transmitter inevitably includes the mounting on the rotor of a source of power supply to the transmitter. Such arrangement imposes strict limitations on the choice of the measuring point on the rotor or its speed of rotation. In addition, the calibration of the transmitter is itself troublesome work. In case a temperature-sensitive resistor or the like is employed, an electromechanical contactor such as a slip ring is needed so that the signal from the rotor may be taken out through such contactor. This arrangement also involves various technological difficulties including mechanical wear in the contacting region and attenuation or reduction in the signal-to-noise ratio of the signal passing through the slip ring. At any rate, previous systems for measuring the rotor temperature have involved various deficiencies in their electrical or mechanical arrangement.

The present invention provides an extremely simplified system for detecting or measuring the rotor temperature which is free from the above deficiencies. The temperature measurement system employs a resonance circuit adapted to be secured to the rotor or the like component and has a resonance frequency variable with temperature. An electromagnetic or electrostatic coupling means is provided between the rotor and the stator side for the purpose of supplying to the resonance circuit an electrical input of variable or fixed frequency from the stator side to enable detection of the resonance frequency corresponding to the particular temperature being measured.

The non-contact temperature measurement system of the present invention is characterized in that it comprises a resonance circuit to be secured to an object to be measured and having a resonance frequency variable with temperature, means for applying an electrical signal of variable frequency to said resonance circuit through inductive coupling means, and means for detecting the resonance frequency of said resonance circuit.

Further features of the invention will become apparent from the following description when read in conjunction with the accompanying drawings, in which.

Description will first be made particularly in connection with the resonance circuit for temperature measurement as used in the system of this invention.

Figure 1:
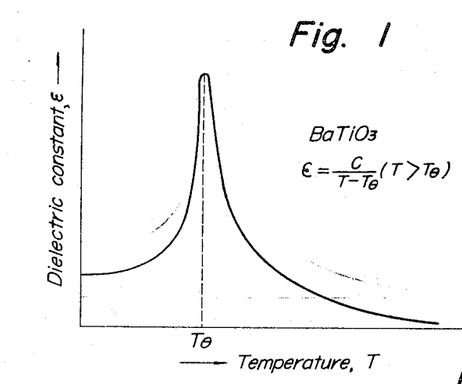
FIG. 1 is a graphical representation of the temperature characteristic of a typical ferrodielectric material.

It is well known that the temperature characteristics of ferrodielectric materials including $BaTiO_3$ (barium titanate) generally obey the Curie-Weiss' law in a temperature range exceeding the Curie point of the material. For instance, $BaTiO_3$ has a temperature characteristic as illustrated in FIG. 1 of the accompanying drawings. As observed in this figure, the Curie-Weiss' law holds in the range of temperature T exceeding the Curie point $T_\theta$. Namely, $$\epsilon = \frac{C}{T-T_\theta} \quad (1)$$

where $\epsilon$ is the dielectric constant and C the Curie constant of $BaTiO_3$. Now, it is assumed that a solid solution of $BatTiO_3$ and, say, $PbSnO_3$ (lead stannate) is employed to form a ceramic capacitor having an operation range beyond or in the vicinity of the Curie point $T_\theta$. Then the following relationship between the capacity C(T) and temperature T of the capacitor is obtained from the Formula 1:

$$C(T) = \frac{K}{T - T_\theta} \quad (2)$$

where K is a constant as determined by the Curie constant and the structure of the capacitor. Since the values of $T_\theta$ and K can be determined by properly selecting the proportions of $BaTiO_3$ and $PbSnO_3$, it is possible to form a ceramic capacitor which is compact and lightweight while having a high rate of capacity variation with temperature, $dc/dT$. The following list includes some examples of ceramic capacitor of this kind.

| Composition: | Operation range, °C. |
| --- | --- |
| $BaTiO_3$–$PbSnO_3$ | 0–200 |
| $(Ba-Sr)TiO_3$ | 0–200 |
| $(Pb-Sr)TiO_3$ | 200–400 |
| $K(Nb-Ta)O_3$ | 200–400 |
| $NaNbO_3$–$PbTiO_3$ | 200–400 |
| $Pb_2Nb_2O_3$ | 10–200 |
| $KTaO_3$ | 10–200 |
| $SrTiO_3$ | 10–200 |

Any of these ceramic capacitors and an inductance element of extremely limited temperature dependency, or two elements having respectively opposite temperature characteristics (in this case, use of ferrite cores having an operation range beyond the Curie point or in the vicinity thereof is recommended, since such ferrite cores have a permeability $\mu$ the temperature characteristic of which obeys Curie-Weiss' law in the temperature range beyond the Curie point or in the vicinity thereof) may be combined to form a resonance circuit which is usable to advantage in temperature measurement, having a resonance frequency varying with temperature. In other words, it has been found that it is possible to form a desired temperature measuring or detecting ssytem including resonance circuit and an arrangement provided on the stator side for detecting the variation in resonance frequency of the circuit directly, or in the form of a variation in the oscillation frequency of an appropriate oscillator including the circuit. It will be recognized that such temperature measurement system can be efficiently used in measuring the temperature of a rotor or the like component at any point thereon because of the compactness and limited weight of the ceramic capacitor and that the large capacity variation with temperature, $dc/dT$, of the ceramic capacitor gives an extraordinarily high sensitivity to the measuring system.

The basic principle of the measuring system of the invention will next be explained with reference to the block diagram of FIG. 2.

Figure 2:
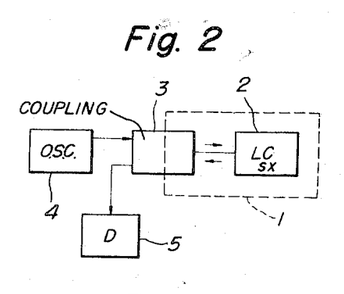
FIGS. 2, 3, 4, 6 and 9 are block diagrams illustrating the basic operating principle of the present invention.

In FIG. 2, reference character 1 designates a rotor carrying a resonance circuit 2, the resonance frequency of which varies with temperature. It is to be understood that the resonance circuit includes an inductance element $L_s$ of limited temperature dependency and a capacitance element $C_x$ such as a ceramic capacitor of the kind described above which has a high temperature dependency. The ceramic capacitor is bonded to the rotor at a point thereon where temperature is to be determined. Reference numeral 3 designates an electromagnetic or electrostatic coupling for transmission of a frequency signal (input signal) between the rotor and the stator side. The coupling thus includes a portion arranged on the rotor side and another portion arranged on the stator side. A variable frequency oscillator 4 is provided for producing a frequency signal to be sent to the coupling 3. A resonance detector 5 is arranged for detecting the resonance occurring in the resonance circuit 2 when said frequency signal has a particular frequency value. With this arrangement, the resonance frequency of the resonance circuit 2 varies with the temperature at the measuring point, the relationship between the resonance frequency and the temperature being determined by the operating characteristics of the reactance element forming the resonance circuit. Accordingly, the resonance frequency of the resonance circuit 2 for the temperature being measured can be given as an oscillation frequency of the oscillator 4, when the resonance point of the resonance circuit 2 is detected by the detector 5, by varying the frequency of the frequency signal transmitted from the oscillator 4 to the rotor 1 by way of the electromagnetic or electrostatic coupling 3. It will be recognized that the temperature of the rotor 1 at any desired measuring point can be read directly from the oscillation frequency of the oscillator 4 only if calibration is made in advance between the resonance frequency and the temperature.

Figure 3:
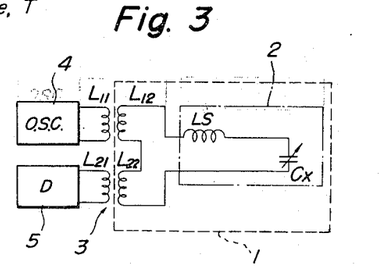

In the practical application of the above-described principle of measurement at least, two methods of detecting the resonance of the resonance circuit 2 are possible. In one method, use is made of a series arrangement of an oscillator 4, a resonance circuit 2 (including $L_s$ and $C_x$) and a resonance detector 5 (FIG. 3). The frequency signal from oscillator 4 enters the resonance circuit 2 by way of an electromagnetic coupling $L_{11}$–$L_{12}$. The rate of transmission of the electromagnetic energy to the resonance circuit is evidently at a maximum when the frequency signal coincides with the resonance frequency of the circuit 2. This phenomenon is detected by means of electromagnetic coupling $L_{21}$–$L_{22}$ and detector 5, which senses the maximum electromagnetic energy (resonance) of circuit 2. In short, this method utilizes the fact that a maximum rate of energy transmission is obtained when the resonance circuit is in resonance. In this case, the electromagnetic coupling device for signal transmission includes an arrangement of coils $L_{11}$ and $L_{21}$ on the stator side and an arrangement of coils $L_{12}$ and $L_{22}$ on the rotor side. In addition, each pair of cooperating coils $L_{11}$–$L_{12}$ or $L_{21}$–$L_{22}$ are brought into opposing relation to each other once in each revolution of the rotor 1 and are arranged with their axes aligned with each other. Coil $L_{11}$ is a transmitter coil for transmitting the frequency signal from the oscillator 4 to the receiver coil $L_{12}$ on the rotor 1, and coil $L_{22}$ is a transmitter coil for transmitting the signal from the resonance circuit to the receiver coil $L_{21}$ on the stator side. The receiver and transmitter coils $L_{12}$ and $L_{22}$ are connected in series forming part of the inductance $L_s$ of the resonance circuit and thus cooperate with the capacitor $C_x$ for temperature measurement, which is closely attached to the measuring point on the rotor 1, to form a resonance circuit. In case the stray capacity of lead wires extending between $L_s$ and $C_x$ is so large as to cause the apparent capacity variation of $C_x$ with temperature to vanish, it is only necessary that both $L_s$ and $C_x$ are closely attached to the measuring point so that the signal from the oscillator 4 is applied to part of $L_s$.

With the above arrangement, the frequency signal produced on the stator side is transmitted to the rotor through the electromagnetic coupling device 3 while, at the same time, the signal from the rotor side (which varies correspondingly to variations in the resonance circuit) is transmitted to the stator side through the coupling 3. It will be observed that temperature measurement or detection can be performed efficiently with this simple arrangement. One important advantage of this arrangement is that the rotor side components can be bonded with ease to the rotor as the coils $L_{11}$ and $L_{12}$ each include only a limited number of turns, e.g., one or two turns.

Figure 4:
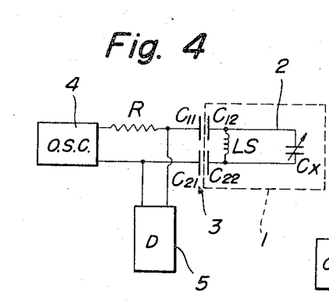
Figure 5:
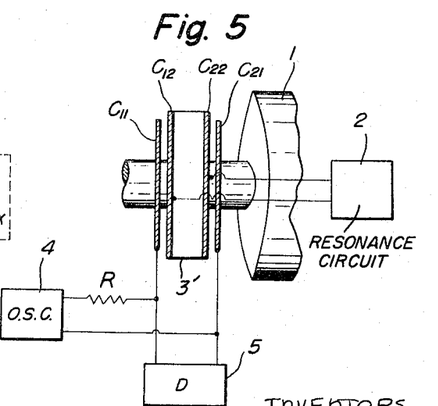
FIGS. 5, 7 and 8 are diagrammatic illustrations of respective forms of the electrostatic coupling incorporated in the system of the invention.

In another method of resonance detection, use is made of a series connection of an oscillator 4 and a resonance circuit 2 (including $L_s$ and $C_x$) with a resonance detector 5 connected in parallel with the resonance circuit 2 (FIG. 4). The frequency signal from the oscillator 4 is transmitted through electrostatic couplings $C_{11}$–$C_{12}$ and $C_{21}$–$C_{22}$ to the resonance circuit 2. With this arrangement, a maximum impedance is obtained when a resonance takes place in the resonance circuit. This impedance reaction phenomenon enables the resonance detector 5 to detect the resonance (or variation in impedance) through the medium of the electrostatic coupling. In other words, with this arrangement the reaction phenomenon of the resonance circuit is utilized which includes the occurrence of a maximum impedance and a maximum input voltage to the resonance detector 5 when a resonance occurs in the resonance circuits. In this case, the electrostatic coupling device for signal transmission includes electrostatic elements $C_{11}$ and $C_{21}$ arranged on the stator side and electrostatic elements $C_{12}$ and $C_{22}$ arranged on the rotor side 1. One specific form of the electrostatic coupling device, as illustrated in FIG. 5, includes a cylindrical insulator 3' fixed to the shaft of the rotor 1 with metal discs comprising electrostatic elements $C_{12}$ and $C_{22}$, affixed to the opposite faces of said insulator 3' to form rotary electrostatic elements. Stationary electrodes $C_{11}$ and $C_{21}$ are arranged opposite to respective rotary electrostatic elements $C_{12}$ and $C_{22}$. Each pair of rotary and stationary electrostatic elements $C_{11}$–$C_{12}$ and $C_{21}$–$C_{22}$ are thus electrostatically coupled, enabling signal transmission between the rotor and the stator side.

Figure 6:
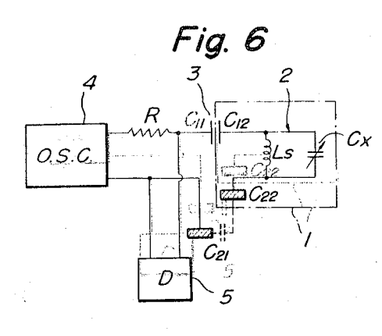
Figure 7:
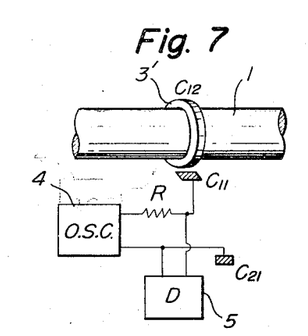
Figure 8:
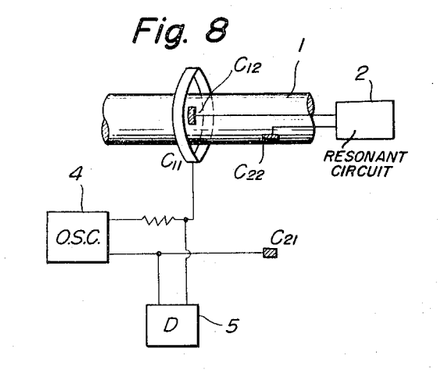

FIGS. 6, 7 and 8 illustrate other forms of such an electrostatic coupling device. The form shown in FIGS. 6 and 7 includes a cylindrical insulator 3' mounted on the shaft of the rotor 1 and an electrostatic element $C_{12}$, comprising a metal plate, bonded to the entire periphery of the insulator 3' to serve as a rotary electrostatic element. A stationary electrostatic element $C_{11}$ is arranged opposite to the rotary electrostatic element $C_{12}$ and connected to the casing of the rotor 1. Electrostatic element $C_{12}$ is electrically connected to a portion of the rotor, e.g. to the shaft thereof. With this arrangement, it will be observed that an electrostatic coupling is established between electrostatic elements $C_{21}$ and $C_{22}$ due to the stray capacity between electrostatic elements $C_{11}$, $C_{12}$ and the rotor, on one hand, and the rotor casing, on the other hand. This coupling is evidently extremely loose but it gives sufficient reaction to detect the impedance variation since the impedance of the resonance circuit is increased practically to infinity when a resonance occurs in the circuit, as will readily be understood.

Referring now to FIG. 8, the coupling arrangement, unlike the above arrangement, includes a rotary electrostatic element $C_{12}$, which is mounted to the rotor shaft, and an annular electrostatic element $C_{11}$ fixed to the stator side at a point opposite to the rotary electrostatic element $C_{12}$ so as to encircle the latter in properly spaced relation thereto. Other electrostatic elements $C_{21}$ and $C_{22}$ are arranged in a manner similar to those in the arrangement shown in FIGS. 6 and 7. With this arrangement, it will be recognized that a similar electrostatic coupling is obtained without the need of any substantial working on the rotor side.

Figure 9:
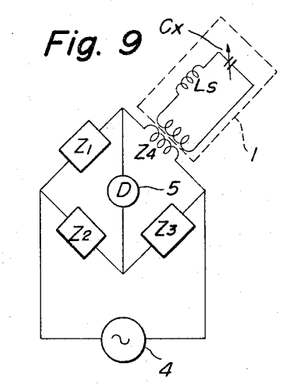

Furthermore, in case the impedance reaction of the resonance circuit is utilized as described above, the sensitivity of the measuring system may be improved by employing an alternating-current bridge circuit including, in one of its arms, an electromagnetic coupling with the resonance circuit, as shown in FIG. 9. It is to be understood that the constants $Z_1$, $Z_2$ and $Z_3$ of the other arms of this A.-C. bridge circuit are so determined that the bridge is balanced when a resonance occurs in the resonance circuit. In this arrangement, the oscillation frequency of the oscillator 4 is increased until the resonance circuit resonates to minimize the input to the resonance detector 5, when the frequency corresponds to the rotor temperature being measured. In the foregoing, this arrangement has been described as applied to temperature measurement, but it may also be used as a detector section of an automatic temperature control system. For example, in an on-off temperature control, the oscillator 4 serves as a simple constant-frequency oscillator, which is set to give an oscillation frequency corresponding to the resonance frequency of the thermometric resonance circuit at a particular setting so that the detector output when the resonance occurs may be employed as a control signal.

Several embodiments of the present invention will be described in detail hereinafter.

Figure 10:
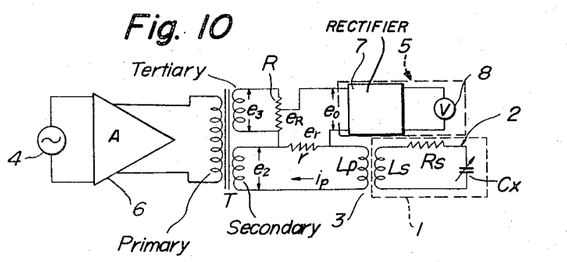
FIGS. 10, 12 and 13 are circuit diagrams of respective embodiments of the invention including a resonance detecting system utilizing the impedance reaction of the resonance circuit for temperature measurement.
Figure 12:
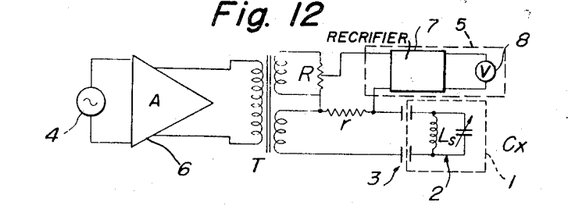
Figure 13:
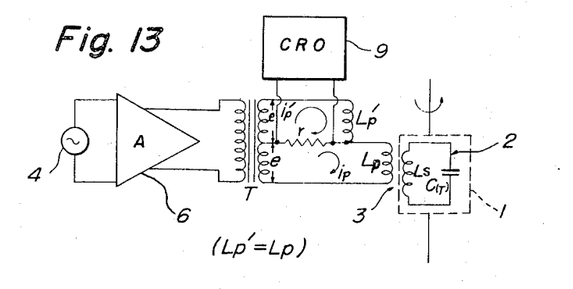

FIGS. 10, 12 and 13 each illustrate a practical embodiment of the invention which is extremely simple in construction and highly sensitive, including an improved resonance detector adapted to utilize the impedance reaction of a resonance circuit as a principal component of the temperature measurement system of the invention.

If an arrangement, for example, as illustrated in FIG. 4, be employed to utilize the impedance reaction phenomenon in actual temperature determination without any modification, it will be impossible to detect the resonance point with any accuracy unless the coupling capacitance is considerably increased because of the limited signal-to-noise ratio, particularly when the resonance circuit has a limited quality factor. However, it is difficult to increase the capacitance of the electrostatic coupling to any substantial extent since the stationary and rotary electrostatic elements $C_{11}$, $C_{21}$ and $C_{12}$, $C_{22}$ cannot be arranged sufficiently close to each other because of the installation limitations. On the other hand, in case an A.-C. bridge circuit is employed as illustrated in FIG. 9, the power source for the coil of the electromagnetic coupling, $Z_4$, is required to be a pure constant-voltage or constant-current source in order to obtain a high signal-to-noise ratio. However, it can hardly be formed as a constant-voltage source because of the nature inherent to a bridge circuit. On the other hand, where a pure constant-current source is employed, the signal-to-noise ratio is usually reduced because of improper impedance matching.

To meet these difficulties, one embodiment of the present invention employs a buffer amplifier 6 connected with the variable frequency oscillator 4, as illustrated in FIG. 10, and having an output impedance properly limited to form a constant-voltage source. Arranged on the output side of the amplifier is transformer T having a primary, a secondary and a tertiary winding, with coupling coil $L_p$ connected to the secondary winding by way of a low resistance $r$ to cooperate with a thermometric resonance circuit 2 secured to the rotor 1 to form an electromagnetic coupling 3. Connected to the tertiary winding of transformer T is a variable resistance R across which is applied a terminal voltage differential relative to that applied across resistance $r$ so that the differential voltage is applied to a resonance detector 5, which is comprised of a peak-value rectifier 7 and a voltmeter 8.

Figure 11:
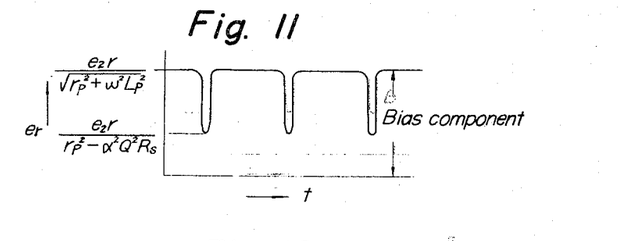
FIGS. 11 and 14 are graphical representations for explaining the operation of the embodiments.

With this arrangement, the coupling coils $L_p$ and $L_s$ assume an effective position once for each revolution of the rotor 1. The secondary current $i_p$, when coupling coils $L_p$ and $L_s$ are not effective, is expressed as follows:

$$i_p = \frac{e_2}{r_p + j\omega L_p} \quad (3)$$

where $r_p$ is the total secondary resistance. When the two coils are coupled and the resonance circuit is not in resonance, the secondary current is:

$$i_p = \frac{e_2}{r_p + \alpha^2 Q^2 R_s} \quad (4)$$

where $\alpha = M/L_s$, $R_s$ is the resistance of the resonance circuit, M is the mutual coupling coefficient between the two coupling coils, and Q is the quality factor of the resonance circuit. Under this condition, concave pulses appear across the opposite ends of the resistance $r$ once for each revolution, as illustrated in FIG. 11. To convert the concave pulses into convex ones, the variable resistance R is adjusted so that the voltage $e_3$ appearing across the tertiary winding of the transformer T satisfies the formula $$e_3 = -\frac{e_2 r}{\sqrt{r_p^2 + \omega^2 L_p^2}}$$

to eliminate the bias component from the concave pulse waves. The differential output $e_0$ between voltages $er$ and $e_3$, thus forming convex pulses, is peak-rectified to be read on the voltmeter 8. In this manner, when the voltmeter 8 gives a maximum reading, the oscillation frequency of the variable frequency oscillator 4 corresponds to the resonance frequency of the resonance circuit 2 and hence to the temperature of the rotor, as will readily be recognized.

FIG. 12 illustrates a modification in which a desired electrical signal is transmitted to the resonance circuit through an electrostatic coupling 3 employed in place of the electromagnetic coupling in FIG. 10.

Figure 14:
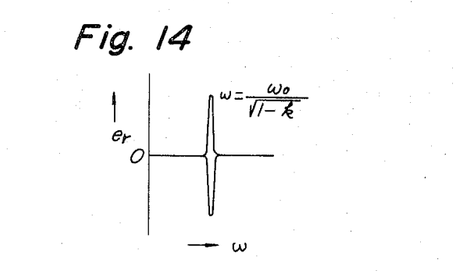

The above bias component may also be eliminated by use of an arrangement illustrated in FIG. 13. In this arrangement, a coil $L_p'$ has the same inductance value as the stator side coupling coil $L_p$ and is connected to the tertiary winding of the transformer T. A cathode-ray oscilloscope 9 is provided to read the voltage appearing across the low resistance $r$. (The voltage may alternatively be read on a voltmeter after it has been peak-rectified.) With this arrangement, in which the bias component (or the current $e/j\omega L_p$ when the coupling is ineffective) is positively eliminated, the highest indication on the cathode-ray tube 9 (FIGS. 13 and 14) gives the apparent resonance point of the resonance circuit, and the signal-to-noise ratio and hence the sensitivity of the measuring system are further improved. In this case, the resonance point is apparently shifted to a point, $$\omega = \frac{\omega_0}{\sqrt{1-k^2}} \left( \text{where } \omega_0 = \frac{1}{\sqrt{L_s C_x}} \text{ and } k = \frac{1}{\sqrt{L_p L_s}} \right)$$

However, this does not involve any particular problem since such shifting can be accommodated by properly calibrating the angular position of a variable capacitor with respect to the surface temperature of the ceramic capacitor $C_x$. As described above, this form of temperature measurement system is arranged so as to take the impedance of the resonance circuit in the form of a current, instead of reading the impedance itself or its voltage equivalent, and thus can give a reading of the resonance point with a considerably high accuracy even when the impedance matching is improper. In addition, with this form of measuring system, it is easy to utilize a constant-voltage source to obtain an extraordinarily high signal-to-noise ratio and a highly improved detector sensitivity without complicating the entire system construction to any extent.

Figures 15, 16, 17:
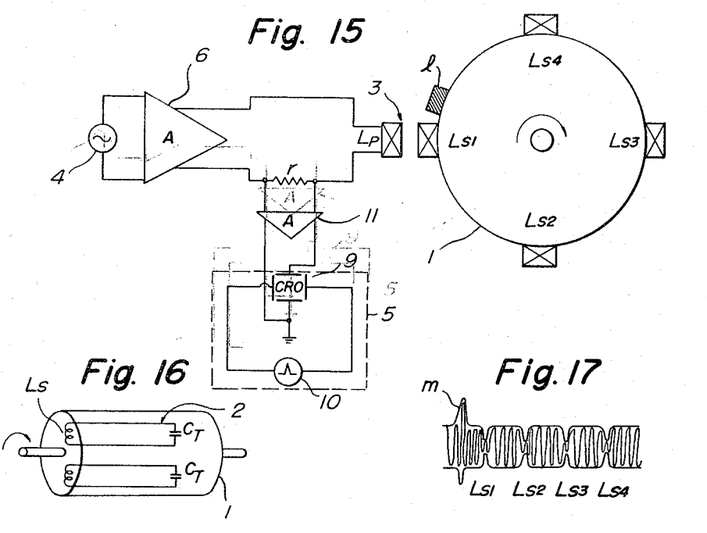
FIGS. 15, 18, 20 and 21 are diagrammatic showings of two forms of multipoint temperature measurement system of the invention which employ a plurality of resonance circuits for temperature measurement as shown in FIG. 16.
FIGS. 17, 19 and 22 are graphical representations for explaining the operation of the two respective embodiments shown in FIGS. 15, 18 and FIGS. 20, 21.
Figures 18, 19, 20:
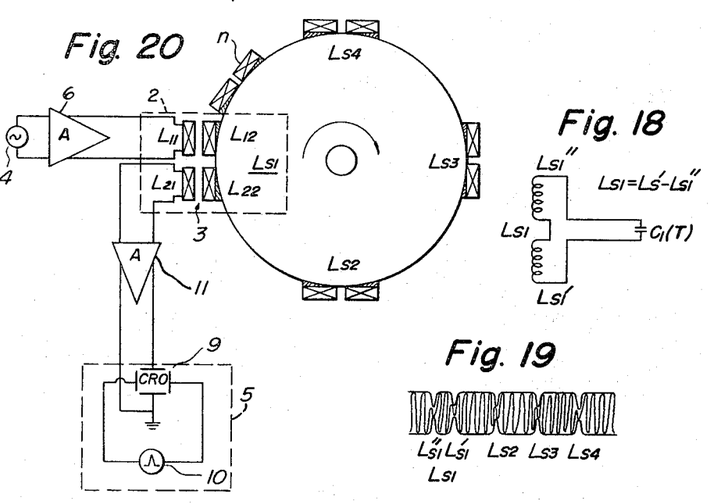

FIGS. 15 and 20 illustrate embodiments of multipoint temperature measurement systems, each including a plurality of resonance circuits for temperature measurement (FIG. 16) arranged so as to enable simultaneous measurement of temperatures at different points on a rotor and in an extremely simple and easy manner.

Referring first to FIG. 15, an appropriate buffer amplifier 6 is connected to a variable frequency oscillator 4 and has an output impedance sufficiently limited to form a constant-voltage source. The output side of the buffer amplifier 6 is connected to a coupling coil $L_p$, by way of a low resistance $r$. Ceramic capacitors C(T) (FIG. 16) each have a capacitance varying with temperature and in use affixed to respective measuring points on the rotor 1 so that said coil $L_p$ may cooperate with coupling coils $L_s$, connected with the respective capacitors C(T), to form an electromagnetic coupling. Each of the coils $L_s$ and the associated capacitor C(T) together form a resonance circuit 2 for temperature measurement.

Resonance detector circuit 5 includes a cathode-ray oscilloscope. The voltage across the low resistance $r$ is impressed to the vertical deflection plate of the oscilloscope by way of an amplifier 11. A sweep generator 10 is provided for the sweep of the oscilloscope 9. In operation, it will be recognized that coils $L_s$ are coupled with the coupling coil $L_p$ once for each revolution of the rotor 1 and at each coupling a frequency signal is fed from the oscillator 4 to the associated resonance circuit 2. If the oscillation frequency of the oscillator is gradually varied, the voltage across the resistance $r$ will be minimized when the frequency of the signal corresponds to the resonance frequency of the resonance circuit 2. Accordingly, when adjustment is made so as to synchronize the sweep with the revolution of the rotor, concave pulse waves as illustrated in FIG. 17 appear on the cathode-ray tube. It is to be understood that the waveform illustrated corresponds to the state in which the rotor has the same temperature at all the measuring points and all the resonance circuits are simultaneously in resonance at the above frequency. Where the measuring points have different temperatures, it is necessary, of course, that the oscillator 4 is progressively adjusted in order to determine those frequencies at which the concave pulses at respective locations in the above waveform are enlarged to a maximum.

Once such frequencies $f_1$, $f_2$, $f_3$ and $f_4$, at which the concave pulses corresponding to the respective positions of coils $L_{s1}$, $L_{s2}$, $L_{s3}$ and $L_{s4}$ are maximized, have been determined from the waveform of FIG. 17 and from the oscillation frequency of the oscillator, the temperatures at the respective measuring points on the rotor can be immediately determined by calibration between the temperature and frequency.

As will be apparent, the concave pulse forms remain fixed in place on the oscilloscope as long as the sweep thereof is in synchronism with the revolution of the rotor. In case a large number of resonance circuits are employed, concave pulses appear in the waveform at a correspondingly large number of locations. This makes it desirable to take measures for discrimination between the pulses appearing at locations corresponding to the respective resonance circuits. According to the present invention, the concave pulses can be clearly discriminated by marking them as described below in detail.

To this end, a metal plate or short ring $l$ of substantially the same size as that of the coupling coils $L_s$ is secured to the rotor 1 closely to any one of the coils, for example, $L_{s1}$, as illustrated in FIG. 15. As the coupling coil $L_p$ on the stator side is rotated opposite to the marker ring $l$ to be reduced in impedance, once for each revolution of the rotor, the voltage across the resistance $r$ is increased independently of the frequency only when the coupling coil $L_p$ is thus in coupled relation to the ring $l$. Therefore, peak $m$ appears ahead of the concave pulse $L_{s1}$ in the waveform on the cathode-ray tube, as shown in FIG. 17. In other words, pulse $L_{s1}$ appears at all times behind the mark or peak $m$ and thus is readily identified. Other concave pulses $L_{s2}$, $L_{s3}$ and $L_{s4}$ follow pulse $L_{s1}$ in that order at regular intervals and are also readily identifiable for the respective resonance circuits. If the marker pulse $m$ is used to forcibly synchronize the sweep of the oscilloscope, the mark appears at the left end of the screen and the concave pulses $L_{s1}$, $L_{s2}$, $L_{s3}$ and $L_{s4}$ are arranged in that order from left to right at regular intervals, further facilitating their discrimination. (Actually, only the trailing edge of the marker pulse appears on the screen.)

In an alternative method of pulse discrimination, any one of the coupling coils $L_s$ on the rotor side, for example, coil $L_{s1}$, is divided into two coil sections $L_{s1}'$ and $L_{s1}''$, which are arranged in the rotor adjacent to each other with other coupling coils $L_s$ arranged in the same manner as in the method described above. The concave pulse from $L_{s1}$ in the waveform obtained with this arrangement (FIG. 18) can readily be identified since it includes two concave formations from $L_{s1}'$ and from $L_{s1}''$ arranged side by side as distinct from a single concave formation of other pulses $L_{s2}$, $L_{s3}$ and $L_{s4}$ (FIG. 19).

Figure 21:
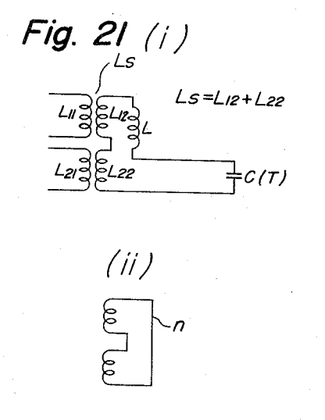

A further embodiment of the present invention is illustrated in FIG. 20. In this embodiment, the coupling coil $L_s$ of each of the resonance circuits 2 is divided into two sections, i.e. receiver coil $L_{12}$ and transmitter coil $L_{22}$, as illustrated in FIG. 21(i). These coils and a resonance coil L of a given inductance value series-connected therewith together form the total inductance of the resonance circuit 2, which further includes a ceramic capacitor C(T) affixed to the measuring point on the rotor for temperature measurement. Coupling coils $L_{11}$ (transmitter coil) and $L_{21}$ (receiver coil) are arranged on the stator side to cooperate with the rotor receiver and transmitter coils $L_{12}$ and $L_{22}$, respectively, to form an electromagnetic coupling 3 for transmission of the frequency signal. Each pair of coils is mounted such that the coil axes of the coils forming the pair are aligned with one another. It is readily understood that coil pairs $L_{12}$–$L_{22}$ and $L_{11}$–$L_{21}$ are opposite each other once for each revolution of rotor 1.

With this arrangement, the variable frequency oscillator 4, each of the resonance circuits 2, and the resonance detector circuit 5 are connected in series with each other once for each revolution of the rotor 1 through the electromagnetic coupling 3 so that the oscillator 4 transmits a frequency signal through the coupling coils $L_{11}$, $L_{12}$ to the resonance circuit 2. Accordingly, a maximum input voltage is detected in the resonance detector circuit 5 through the intermediary of the coupling coils $L_{22}$ and $L_{21}$ when the resonance circuit 2 assumes its resonant state. In short, this system is arranged to detect the resonance point by utilization of the phenomenon that the resonance circuit gives a highest rate of electromagnetic energy transmission when in resonance.

Figure 22:
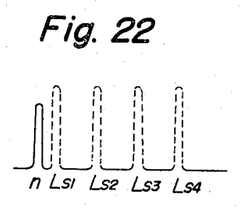

This measuring system also incorporates an appropriate means for discrimination of the output pulses from the respective resonance circuits or voltage inputs to the resonance detector, as in the case of FIG. 15. In the form illustrated in FIG. 20, marker coil $n$, short-circuited as shown in FIG. 21(ii), is affixed to the rotor, for example, ahead of the coupling coil $L_{s1}$. Coil $n$ develops a voltage across the receiver coil $L_{21}$ when coupled with the transmitter coil $L_{11}$ on the stator side independently of the frequency level. On the other hand, each of the resonance circuits acts to develop a voltage only when the frequency signal transmitted corresponds to the resonance frequency of the resonance circuit. Consequently, the position of a pulse appearing continuously on the cathode-ray tube, irrespective of the sweep corresponds to the position of the marker coil $n$. This pulse precedes, at all times, the pulse corresponding to the coupling coil $L_{s1}$, as seen in FIG. 22. Accordingly, the pulse $L_{s1}$ and those pulses corresponding to the respective coupling coils $L_{s2}$, $L_{s3}$ and $L_{s4}$ can readily be discriminated from each other. Of course, it is desirable that the marker pulse is employed for forced synchronization of the sweep of the cathode-ray tube, as described in connection with the embodiment of FIG. 15. In the foregoing description, an electromagnetic coupling means has been employed for transmitting a frequency signal to the resonance circuits, but, as will be apparent, such signal transmission may be effected through an appropriate electrostatic coupling means when desired.

As apparent from the foregoing, the multipoint temperature measurement system of this invention not only eliminates the need of mounting a transmitter of complicated construction, having a built-in power supply source and other components on the rotor to be measured, but also makes it possible to determine the temperatures at a multitude of measuring points simultaneously by securing resonance circuits to the respective measuring points and without use of any switching means.

The following description sets forth modified forms of the temperature measurement system of the invention employing a further development of the resonance detection based upon the frequency modulation technique.

Figure 23:
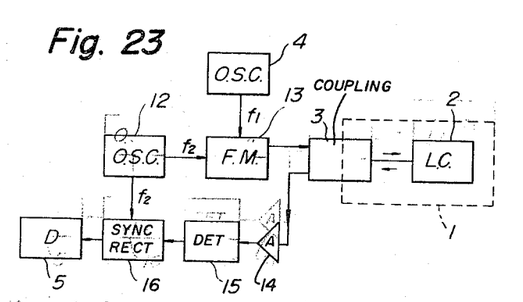
FIG. 23 is a block diagram illustrating another embodiment of the invention employing a resonance detection system which utilizes a frequency modulation method.

FIG. 23 is a block diagram illustrating the basic arrangement of the frequency modulation system. With this arrangement, the variable frequency signal $f_1$ from the variable frequency oscillator 4 is frequency-modulated in a frequency modulation circuit 13 by the oscillation frequency $f_2$ of a low-frequency oscillator 12. Frequency $f_2$ is determined by the quality factor Q of the resonance circuit 2 on the rotor 1 and is required to satisfy the relation $f_1 > f_2$. The signal $f_1$ modulated by $f_2$, is taken from the rotor 1 through the electromagnetic or electrostatic coupling 3, as with the case described hereinbefore, to be transmitted through an amplifier 14 to a detector 15, which takes out the signal $f_2$ from the frequency-modulated signal $f_1$. The signal $f_2$ is converted into a direct-current signal by a synchronous rectifier 16 having a reference frequency $f_2$. The D.C. signal obtained through such frequency discrimination is applied to the resonance detector 5.

Figure 24:
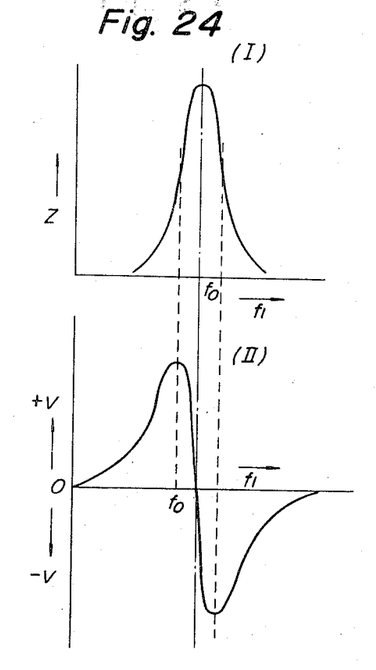
FIG. 24 is a graphical representation of the operation characteristics of the embodiment shown in FIG. 23.

Assume that when the resonance circuit is at a temperature T it has a resonance frequency $f_0$, as illustrated in FIG. 24(I), and that the signal $f_1$, frequency-modulated by $f_2$, is impressed to the resonance circuit 2. If the modulated signal $f_1$ is varied from a lower frequency to a higher frequency through the frequency $f_2$ for frequency discrimination of the signal $f_2$ in the modulated signal $f_1$, it is apparent from well-known demodulation theory that a direct-current voltage V, as an output of the synchronous rectifier 16, is obtained which is proportional to the differential function of the resonance curve (I) in FIG. 24, as illustrated at (II) in the figure. It will be understood that the oscillation frequency $f_0$ of the oscillator 4 when the output voltage V is at zero or when its sign changes from positive to negative corresponds to the temperature T of the rotor. By such a measuring procedure, the resonance point can readily be determined with accuracy, as will be readily understood. In addition, the use of frequency modulation gives an improved signal-to-noise ratio and an extremely high detector sensitivity to the system.

Figure 25:
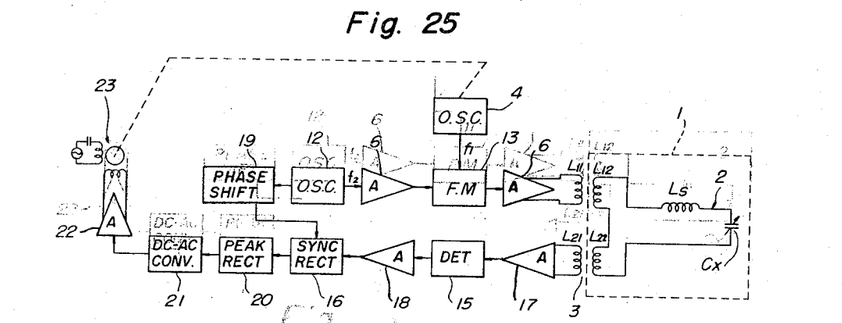
FIG. 25 is a block diagram of one form of self-balance type temperature measurement system according to the invention employing the resonance detection system.

FIG. 25 illustrates an example of a self-balance type temperature measurement system employing the above-described detecting procedure. Components 1, 2, 3, 4, 5, 12, 13, 15 and 16 are identical to those indicated by like references in FIG. 23. Reference numeral 17 indicates a wide-band amplifier, 18 a low frequency amplifier, 19 a phase shifter for controlling the phase of the reference voltage (referred to as $f_2$ in the above), and 20 a peak-value rectifier circuit. It will be obvious from the description made hereinbefore that the output voltage from the rectifier circuit takes the form as illustrated in FIG. 24(II). A D.C.–A.C. converter 21 is provided for converting the output voltage into an alternating-current voltage, say, of 50 c.p.s., which is amplified by a power amplifier 22 to energize a servomotor 23. It is to be understood that the servomotor 23 is arranged so as to continously control the capacitance of a given variable capacitor arranged in the oscillator 4 to control its oscillation frequency in a manner so that the oscillation frequency automatically follows the resonance frequency of the circuit 2. It will be recognized that the temperature of the rotor 1 at any measuring point can be automatically recorded as long as calibration is made in advance between the resonance frequency and the angular position of the variable capacitor.

Figure 26:
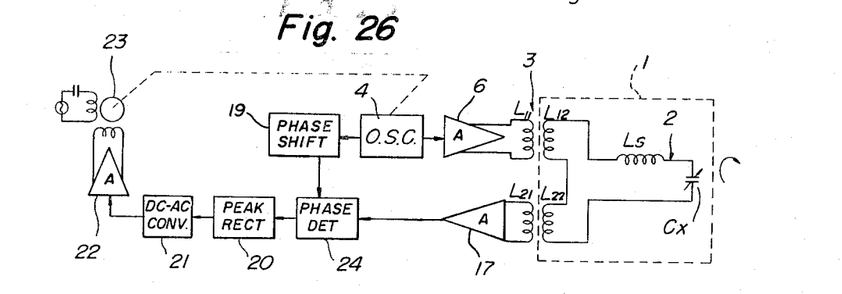
FIGS. 26 and 30 are diagrams illustrating another form of self-balance type temperature measurement system of the invention which employs a resonance detection system utilizing a phase detection method.

As a practical matter, however, the measuring system employing a resonance detection system as described above may become complex, bulky and expensive. The embodiment shown in FIG. 26 is designed to overcome these drawbacks. As shown, this embodiment is simplified to a substantial extent by employing the output voltage or frequency signal from the variable frequency oscillator 4 as a reference voltage for phase detection or discrimination for obtaining the same characteristics as illustrated in FIG 24(II), instead of employing a frequency modulation system for the purpose.

Figure 27:
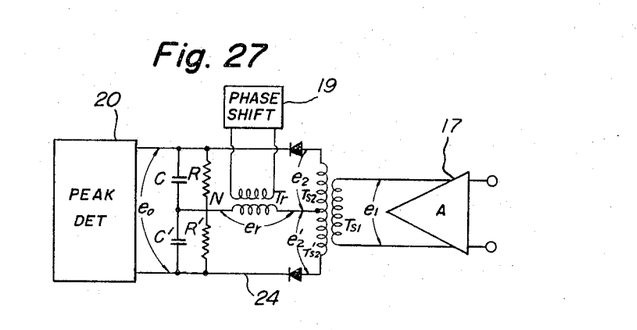
FIG. 27 is a circuit diagram of the phase detector as an essential component of the embodiment shown in FIGS. 26 and 30.

In FIG. 26, reference numeral 17 designates a wideband amplifier, 19 a phase shifter for regulating the phase of the reference voltage (the frequency signal referred to above), and 24 a phase detector for the frequency signal transmitted from the rotor 1. FIG. 27 illustrates one example of circuit arrangement of such phase detector. Reference numeral 20 designates a peak-value rectifier circuit and 21 a D.C. to A.C. converter for converting the D.C. output voltage of the rectifier circuit 20 into an A.C. voltage, say, of 50 c.p.s., which is amplified by a power amplifier 22 to energize a servomotor 23. The servomotor 23 is arranged so as to continuously control the capacitance of a given variable capacitor in the oscillator 4 in a manner so that the oscillation frequency of the oscillator automatically follows the resonance frequency of the circuit 2. An ink pen (not shown) is associated with the rotation of the servomotor 23 for the purpose of recording the temperature being measured on an appropriate chart on a recorder.

This measuring system operates as follows (FIG. 27). As the resonance frequency of the resonance circuit 2 varies with the temperature at the measuring point, a voltage $e_1$ is produced in the output of the wide-band amplifier 17 corresponding to the state of the resonance circuit 2 because of the change in frequency signal transmitted from the oscillator 4 to the rotor 1 by way of the electromagnetic coupling 3. The reason for this is that there is a definite relationship between the resonance frequency of the circuit 2 and the temperature, said relationship being determined by the operating characteristics of the reactance element forming the circuit 2. The voltage $e_1$ is applied to the primary winding $T_{s1}$ of the phase detector 24, which operates on the oscillator voltage as a reference voltage therefor. In this manner, voltages $e_2$ and $e_2'$ apppearing across the respective secondary windings $T_{s2}$ and $T_{s3}$, which are wound so as to give an opposite polarity, are phase-detected by means of the output voltage $e_r$ of a reference-voltage transformer $T_r$. The process of such detection is illustrated in the vector locus of FIG. 28.

Figure 28:
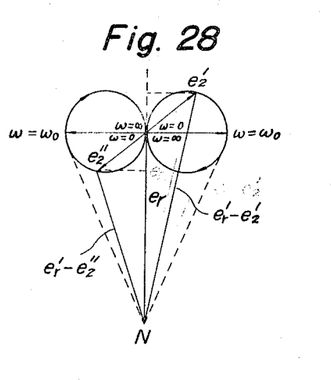
FIG. 28 is a vector locus illustrating the operation characteristics of the phase detector.

The vector locus of the voltage $e_1$ as obtained by varying the frequency of the oscillator 4 is circular due to the characteristics of the resonance circuit 2. Accordingly, the vector loci of the voltages $e_2$ and $e_2'$ are also circular, rotating in an opposite direction, as shown in FIG. 28. Therefore, capacitors C and C' are charged up to D.C. voltages $|\dot{e}_r+\dot{e}_2|$ and $|\dot{e}_r+\dot{e}_2'|$, respectively. Thus, the output voltage of circuit 24 is given by $$e_0=|\dot{e}_r+\dot{e}_2|-|\dot{e}_r+\dot{e}_2'| \qquad (5)$$

where $e_r$ is high enough to give the relation, $$|\dot{e}_r|\gg|\dot{e}_2|=|\dot{e}_2'|.$$

The output voltage $e$ will be nearly equal to the projection of $2|\dot{e}_2|$ on the vertical axis (indicated at $e_r$ in FIG. 28).

$$e_0\doteq\frac{-K_x}{1+4Q^2X^2}|\dot{e}_1| \qquad (6)$$

where Q is the quality factor of the resonance circuit 2, $$X=\frac{\omega-\omega_0}{\omega_0}$$

Figure 29:
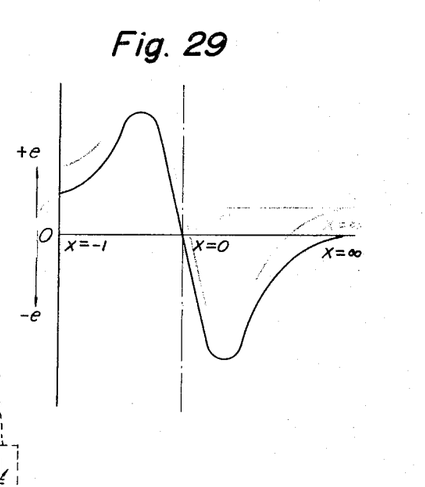
FIG. 29 is a graphical showing of the output voltage of the phase detector.
Figure 30:
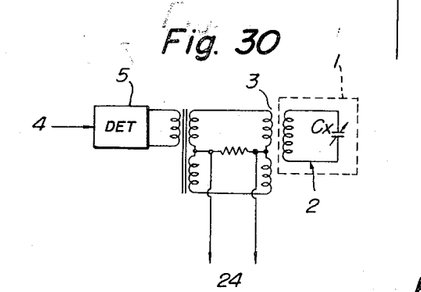
Figure 31:
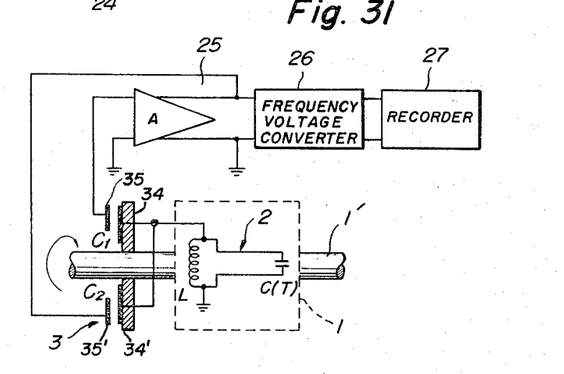
FIG. 31 is a circuit diagram of a further embodiment of the invention including an oscillator network comprised of a resonance circuit for temperature measurement and an amplifier electrostatically coupled therewith.

$\omega_0=2\pi f_0$ ($f_0$ is the resonance frequency of the resonance circuit 2) and K a constant. It follows that as X varies from $-1$ to $+\infty$ the output voltage $e_0$ varies as illustrated in FIG. 29. At $X=0$, i.e. when the frequency $f$ of the frequency signal from the oscillator 4 equals the resonance frequency of the resonance circuit at the particular temperature, the output voltage $e_0$ is equal to zero, changing its sign at this point. Therefore, the servomotor 23 will operate so as to reduce to zero the deviation, if any, of the frequency $f$ from the resonance frequency $f_0$ thereby to maintain the variable capacitor of the oscillator 4 at a point $X=0$. Acccordingly, as long as the angular position of the variable capacitor is calibrated relative to the resonance frequency, the temperature of the rotor 1 at any desired measuring point can be determined automatically, the resonance frequency corresponding to the temperature. Though in the above system the resonance point is determined by utilizing the phenomenon that the rate of electromagnetic energy transmission is at a maximum when the frequency signal has a frequency corrresponding to the resonance frequency, the same objective can be more simply attained by utilizing the impedance reaction phenomenon that the impedance of the resonance circuit is maximized when the frequency of the signal corresponds to the resonance frequency. It will be apparent that either of the embodiments shown in FIGS. 25 and 26 can be modified to serve as a constant temperature controller by use of an actuator operable in association with the follow-up movement of the servomotor for the purpose of providing the control power required. It will be seen that the embodiments of the invention described hereinbefore are all arranged so as to obtain the variation in temperature as that of the resonance frequency of a resonance circuit for temperature measurement. Contrarily, the embodiment shown in FIG. 31 is arranged so as to determine the rotor temperature by sensing the variation in resonance frequency of a resonance circuit as a variation in oscillation frequency of an oscillator circuit. The oscillator circuit is formed of the resonance circuit, an electrostatic coupling between the rotor and the stator side, and an appropriate amplifier.

Figure 33:
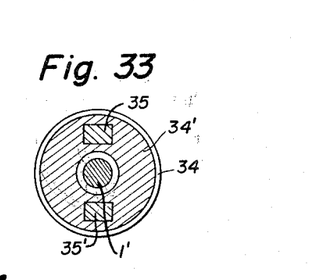
FIG. 33 is a front elevation showing in cross section the electrostatic coupling employed in the embodiment.

Referring to FIG. 31, reference numeral 2 designates a resonance circuit arranged on the rotor so that its resonance frequency varies with the rotor temperature. An electrostatic coupling device 3 is provided for transmission of the oscillation frequency signal between the rotor and the stator side. The coupling device 3 includes (FIG. 33) a rotary electrostatic element 34' mounted on a disk insulator 34 fitted to the rotor shaft 1' and stationary electrostatic elements 35, 35' arranged on the stator side opposite to the rotary electrostatic element to cooperate therewith to form respective capacitances $C_1$ and $C_2$, therebetween. The resonance circuit is connected at one end to the rotary electrostatic elements 34' and is grounded at the other end through the rotor casing. Stationary electrostatic elements 35 and 35' are connected respectively to the input and output terminals of an amplifier 25, which in turn is connected to a recorder 27 by way of an appropriate frequency-voltage converter 26.

Figure 32:
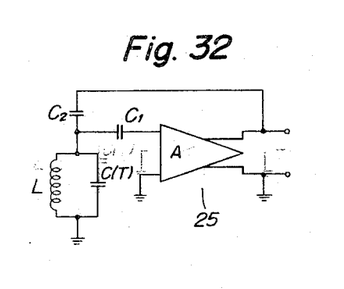
FIG. 32 is a diagram of the equivalent circuit of the embodiment shown in FIG. 31.

Thus, it will be seen that this embodiment of the invention has an equivalent circuit as shown in FIG. 32. As apparent from the figure, the equivalent circuit is nothing but a Franklin oscillator. Accordingly, as the capacitance of the ceramic capacitor C(T) varies with the temperature at the measuring point, the resonance frequency of the resonance circuit and hence the oscillation frequency of the Franklin oscillator varies correspondingly. Thus, it will be seen that there is a definite relationship between the oscillation frequency and the temperature being measured. This relationship is determined by the operation characteristics of the reactance element forming the resonance circuit. It will be recognized that the rotor temperature can be automatically and continuously measured or detected by introducing the output of the amplifier 25 into a recorder 27 after the output has been converted by converter 26 into a D.C. voltage.

On this occasion, the electrostatic capacities $C_1$ and $C_2$ may each be from several picofarads to 10 at most picofarads, and the rotary and stationary electrostatic elements may be spaced apart from each other to a considerable extent. It will be recognized that this thermometric system can serve its purpose with an extraordinarily simple construction, including an extremely simple thermometric resonance circuit and a Franklin oscillator comprised of an appropriate electrostatic coupling and an amplifier. In addition, since the Franklin oscillator has electrostatic capacities $C_1$ and $C_2$ each of a very limited value, its oscillation frequency is determined solely by the inductance L and capacitance C(T) of the thermometric resonance circuit, but is absolutely independent of the rotation of the rotor. Due to this, measurement or detection can be made with a high accuracy in any circumstances.

As pointed out hereinbefore, the temperature measurement system of this invention employs a resonance circuit for temperature measurement which includes a capacitor having an electrostatic capacity highly dependent upon the temperature (e.g., a ceramic capacitor of the kind described, which is compact, light in weight and has a high temperature dependency) and an inductance element of limited temperature dependency. Alternatively, two elements having respectively opposite temperature characteristics may be used. In this connection, it is to be noted that it is difficult to obtain ceramic capacitors having, at all times, the same capacity at any temperature. Ceramic capacitors are customarily produced with capacity tolerances of the order of ±20 to 30 percent. Unless appropriate measures be taken to compensate for such variations in capacitance, the resonance frequency of the resonance circuit will be influenced to such an extent as to necessitate a calibration in each temperature determination. In addition to the variations in capacitance of the thermometric capacitor, the stray capacitance, for example, between lead wires cannot be neglected in case their length is substantial, and calibration is also needed for such stray capacitance to obtain an accurate measurement.

Attention is also called to the fact that any inductance element of limited temperature dependency used in the resonance circuit exhibits an inductance value varying with the material of the object to which the element is bonded. For example, the inductance of the element when affixed to a copper wire differs from that when mounted to a silicon steel sheet. Moreover, the inductance value actually obtained is very limited. Thus, compensation is also required for such effective inductance value.

To avoid these practical inconveniences, in a further modification of the invention, an appropriate compensating element is inserted in the resonance circuit for oscillation on the stator side to cooperate with the reactance element in the resonance circuit to compensate for the various difficulties mentioned above including the deviation of the thermometric capacitor from a reference capacitor and the stray capacitance between lead wires. By this means, the temperature at any measuring point can be determined at once without the need for calibration in each temperature measurement. This modification will next be described with reference to FIG. 34.

Figure 34:
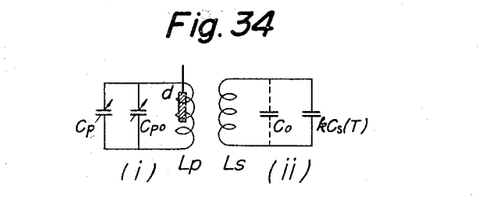
FIGS. 34, 35 and 36 are diagrams explaining the measuring procedure in which compensation is made for errors, for example, resulting from variations in the circuit elements employed in the system of the invention.

In FIG. 34, there are illustrated in resonance circuit (i) for oscillation and another resonance circuit (ii) for temperature measurement. The resonance circuit (i) includes a capacitor $C_p$, an inductance element $L_p$, a duct core $d$ for adjustment of the inductance value of the element $L_p$, and a capacitor $C_{po}$ for compensating the stray capacity. In the resonance circuit (ii), reference character $C_0$ represents the stray capacitance between lead wires, and $k$ represents the deviation factor of the thermometric capacitor $C_s$. (The factor $k$ is usually from 0.9 to 1.1.) On the other hand, the values $C_s$ and $C_p$ cannot be made at the ratio of 1:1 but are required to be in the relation, $C_s \gg C_p$, to satisfy the oscillation condition for the oscillator 4. Accordingly, the temperature scale on the capacitor $C_p$ is graduated in values $C_s/\alpha$ for respective temperatures. Here $\alpha$ is the capacitance ratio, $C_s/C_p$. Description will be made below on the manner in which the compensating element $C_{po}$ and other circuit constants are determined.

Figure 35:
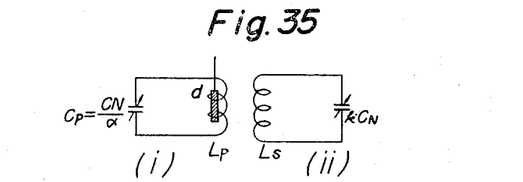

As illustrated in FIG. 35, a variable capacitor $C_N$, which has no temperature dependency and carries a scale of the deviation factor $k$, is connected with the inductance $L_s$ in place of the capacitor $C_s$ in the resonance circuit for temperature measurement (ii), and the value $C_N$ is multiplied by the value $k$, which is known. (In this case, the lead wires are minimized in length so that $C_0$ is reduced to zero.) On the other hand, a marking is provided on the capacitor $C_p$ at a point corresponding to the capacity of $C_N/\alpha$ ($\alpha$ is also known) and the capacitor $C_p$ is adjusted to the marking. On this occasion, the capacitor $C_{po}$ is to be set at zero in advance. If the capacitance cannot be reduced below a certain level, say, of the order of 10 picofarads, the marking on the capacitor $C_p$ should be located with such residual capacity included in $C_N/\alpha$. Then, the dust core $d$ on the inductance $L_p$ is adjusted to supply a required frequency signal to the resonance circuit (ii) and the resonance of this circuit is sensed with the detector circuit 5. The frequency $f_r$ in this case is given by the expression $$f_r = \frac{1}{2\pi\sqrt{\frac{C_N}{\alpha} \cdot L_p}} = \frac{1}{2\pi\sqrt{kC_N L_s}} \quad (7)$$

and hence $L_p$ is given by $$L_p = \alpha k L_s \quad (8)$$

Figure 36:
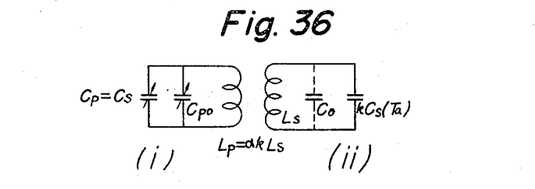

Then, variable capacitor $C_N$ is removed and lead wires connected to $L_s$ and bridged by the ceramic capacitor $C_s$, as shown in FIG. 36. Capacitor $C_p$, having a temperature scale graduated relative to standard capacitor $C_s$ ($k=1$), is adjusted to the graduation corresponding to the actual ambient temperature $Ta$. The capacitor $C_p$ then must have a capacitance of $C_s(Ta)/\alpha$ to place the resonance circuit in resonance as long as the stray capacitance $C_0$ between the lead wires is zero. As a matter of practice, however, $C_0$ is usually of the order of 200 to 300 picofarads and the resonance circuit is out of resonance. Therefore, it is necessary to increase the capacitance of the compensating capacitor $C_{po}$ to place the circuit in resonance. It will be seen that the $C_{po}$ thus adjusted has a capacitance value effective to compensate for the stray capacitance $C_0$ between the lead wires, due regard being paid to the two constants $\alpha$ and $k$. This is because the frequency $f_0$ is then given by the expression $$f_0 = \frac{1}{2\pi\sqrt{\left\{\frac{C_s(Ta)}{\alpha} + C_{po}\right\}\alpha \cdot k L_s}} = \frac{1}{2\pi\sqrt{\{kC_s(Ta) + C_0\}L_s}} \quad (9)$$

and therefore $$C_{po} = \frac{C_0}{\alpha k} \quad (10)$$

Thus, irrespective of the deviation factor of the capacitor $C_s$ for temperature measurement and no matter what stray capacitance $C_0$ is formed between the lead wires and to what extent the effective value of the inductance $L_s$ varies, such indefinite factors can all be compensated by the inductance $L_p$ and the compensating capacitor $C_{po}$ in the resonance circuit on the measuring side. Thus, it will be understood that the scale on capacitor $C_p$ is only required to be graduated with reference to the capacitor $C_s$ as a standard. In addition, such compensation may be effectively made not only for a resonance circuit for temperature measurement, which includes a capacity of high temperature dependency and an inductance having no temperature dependency, as described above, but also for a circuit including two elements having respectively opposite temperature characteristics.

As apparent from the foregoing, the temperature measurement system of the present invention eliminates the need of mounting a power source on a rotor or the like no matter what form of measuring procedure is taken, since it employs a transducer in the form of a purely passive circuit such as a resonance circuit including a capacitance C and an inductance L. Also, the resonance circuit can be made compact and light in weight by employing a frequency signal of high frequency and a reactance element for temperature measurement, for example, in the form of a ceramic capacitor of the kind described, and such resonance circuit is highly advantageous in that it can readily be fixed to any desired measuring point. A further advantage of this system is that it is capable of measuring or detecting the temperature of a rotor at any point thereon, no matter how high is the speed of rotation of the rotor, without any substantial friction loss as it employs an electromagnetic or electrostatic coupling for signal transmission between the rotor and the stator side. Further, it will be apparent to those skilled in the art that the present invention is not limited to the temperature measurement of a rotating body but may be used conveniently in measuring the temperature such as of a gaseous fluid or liquid held in an enclosure such as a tank.

As many different embodiments of this invention can be made without departing from the spirit and scope thereof, it is to be understood that the invention is not to be limited except as defined by the claims.

What is claimed is:

1. A non-contact temperature measuring device comprising a resonance circuit to be secured to a rotor to be measured and having a resonance frequency variable with temperature, a constant-voltage source for applying an electrical signal of variable frequency to said resonance circuit through inductive coupling means assuming an effective position once for each revolution of said rotor, a compensation circuit arranged to draw a current corresponding to the impedance variation of said resonance circuit through said inductive coupling means and to eliminate the bias component of said current therefrom, and means for detecting said resonance frequency through the output of the last-mentioned circuit.

2. A multipoint temperature measurement system comprising a plurality of resonance circuits to be secured to a rotor and each having a resonance frequency variable with temperature, means for applying an electrical signal of variable frequency to said resonance circuits through inductive coupling means, a cathode-ray oscilloscope for detecting the resonance frequencies of said respective resonance circuits, and means for synchronizing the sweep frequency of said cathode-ray oscilloscope with the rotation frequency of said rotor.

3. A multipoint temperature measurement system comprising a plurality of resonance circuits to be secured to a rotor and each having a resonance frequency variable with temperature, means for applying an electrical signal of variable frequency to said resonance circuits through inductive coupling means, a cathode-ray oscilloscope for detecting the resonance frequencies of said resonance circuits, means for forming a marker pulse closely adjacent to a signal showing on said cathode-ray oscilloscope corresponding to any one of said resonance circuits, and means for synchronizing the sweep frequency of said cathode-ray oscilloscope with said marker pulse.

4. A self-balance type temperature measurement system comprising a resonance circuit to be secured to an object to be measured and having a resonance frequency variable with temperature, means for applying an electrical signal of variable frequency to said resonance circuit through inductive coupling means, a circuit for phase-detecting a signal corresponding to the variation in said resonance circuit by means of said electrical signal as a reference voltage, and means for controlling the frequency of said electrical signal by the output voltage of said phase-detecting circuit so as to follow up said resonance frequency.

5. A self-balanced type temperature measurement system comprising a resonance circuit to be secured to an object to be measured and having a resonance frequency variable with temperature, means for applying a frequency modulation signal of variable frequency to said resonance circuit through inductive coupling means, a circuit for discriminating said frequency-modulation signal corresponding to the variation in said resonance circuit, and means for controlling the frequency of the modulated wave by the output voltage of said discriminating circuit so as to follow up said resonance frequency.

6. A temperature measurement system including a resonance circuit to be secured to an object to be measured and having a resonance frequency variable with temperature, an oscillator for supplying an electrical signal of variable frequency to said resonance circuit through inductive coupling means, and means for detecting the resonance frequency of said resonance circuit, said system comprising a reactance element for setting the resonance circuit of said oscillator, and a second reactance element for compensation connected to said resonance circuit for oscillation, said two reactance elements being adjustable corresponding to the deviation from a predetermined condition of the reactance element in the first-mentioned resonance circuit for temperature measurement.

7. The non-contact temperature measuring device as in claim 1 wherein said compensation circuit includes transformer means having a primary winding connected to said constant-voltage source, secondary winding means and tertiary winding means, said secondary winding means being connected to said coupling means through resistance means, said tertiary winding means being parallelly connected to variable resistance means, said resistance means and said variable resistance means being connected to each other and to said means for detecting said resonance frequency such that said output is a voltage differential of the voltage across said resistance means and said variable resistance means.

8. The non-contact measuring device as in claim 1 wherein said coupling means is inductive, said compensation circuit includes transformer means having a primary winding connected to said constant-voltage source, and inductively equivalent secondary winding means and tertiary winding means, said secondary winding means being connected to said inductive coupling means through resistance means, said tertiary winding means being connected by said resistance means to inductor means serially connected to said inductive coupling means and to said tertiary winding means whereby a current through said resistance means from said secondary winding means and said tertiary winding means are opposed, said inductor means having the same inductance value as said inductive coupling means, such that the output of said means for detecting said resonance frequency is the voltage across said resistance means.

9. The multipoint temperature measurement system as in claim 2, further comprising stator means, wherein said plurality of resonance circuits each have first receiver coil means and first transmitter coil means mounted on said rotor in aligned spaced relation to each other, said first receiver coil means and said first transmitter coil means forming a part of said inductive coupling means, and inductive coupling means having second receiver coil means and second transmitter coil means mounted on said stator means in aligned spaced relation to each other such that as said rotor is rotated said first receiver coil means and said first transmitter coil means of said plurality of resonance circuits are successively coupled to said second transmitter coil means and said second receiver coil means, respectively, said means for applying an electrical signal of variable frequency being connected to said second transmitter coil means, and said cathode ray oscilloscope being connected to said first receiver coil means.

10. The multipoint temperature measurement system as in claim 9, further comprising marker means for forming a marker pulse closely adjacent to a signal showing on said cathode ray oscilloscope corresponding to any one of said plurality of resonance circuits, said marker means further including marker coil means having first and second series connected coil means mounted on said rotor in spaced relation adjacent an individual one of said first receiver coil means and first transmitting coil means to provide said marker pulse as said rotor rotates to bring said first and second series connected coil means in coupled relation to said second receiver coil means and said second transmitter coil means.

11. The multipoint temperature measurement system as in claim 3, wherein said means for forming a marker pulse further includes inductor means mounted on said rotor in spaced relation to an individual one of said plurality of resonant circuits.

12. The multipoint temperature measurement system as in claim 3, wherein said coupling means includes inductor means formed by two series connected coil means mounted on said rotor in spaced relation to an individual one of said plurality of resonant circuits, said inductor means forming a part of said means for forming said marker pulse.

13. The self-balance type temperature measurement system as in claim 4, including stator means, and wherein said resonance circuit includes first receiver coil means and first transmitter coil means mounted on said rotor in aligned spaced relation, said first transmitter coil means forming a part of said inductive coupling means, said inductive coupling means having second receiver coil means and second transmitter coil means mounted on said stator means in aligned spaced relation such that as said rotor is rotated said first receiver coil means and said first transmitter coil means are coupled to said second transmitter coil and said receiver coil means, respectively, once each revolution of said rotor, said means for applying an electrical signal of variable frequency being connected to said second transmitter coil means, and said circuit for phase-detecting a signal corresponding to the variation in said resonant circuit being connected to said first receiver coil means.

14. The self-balancing type measurement system as in claim 5, including stator means, wherein said resonance circuit includes first receiver coil means and first transmitter coil means mounted on said rotor in aligned spaced relation, said first receiver coil means and said first transmitter coil means forming part of said inductive coupling means, said inductive coupling means having second receiver coil means and second transmitter coil means mounted to said stator means in aligned spaced relation such that as said rotor is rotated said first receiver coil means and said first transmitter coil means are coupled to said second transmitter coil means and said second receiver coil means respectively, once each revolution of said rotor, said means for applying a frequency modulation signal of variable frequency being connected to said second transmitter coil means, and said circuit for discriminating said frequency-modulation signal being connected to said first receiver coil means.

15. A temperature measurement system for measuring the temperature of an object, comprising; resonant circuit means mounted on said object, said resonant circuit means having a resonant frequency variable with temperature, amplifier means having an input and an output, intermittent coupling means connecting said resonant circuit means to said amplifier means, said resonant circuit means, intermittent coupling means, and amplifier means forming a variable oscillation means, and detection means for detecting the oscillation frequency of said variable oscillation means.

16. The temperature measurement system as in claim 15, wherein said object has a movable member rotatable with respect to a fixed member, said resonant circuit means including temperature variant capacitance means and non-temperature sensitive inductor means mounted on said movable member, said coupling means including first capacitor means and second capacitor means each having first electrostatic element means mounted to said fixed member in coupled association with second electrostatic element means mounted on said movable member, said amplifier input coupled to said resonant circuit by said first capacitor means, said amplifier output coupled to said resonant circuit means by said second capacitor means and connected to said detection means such that said variable oscillation frequency of said variable oscillation means corresponding to temperature variations in said temperature variable capacitance means is determined.

References Cited by the Examiner
UNITED STATES PATENTS

| | | | |
|---|---|---|---|
| 2,575,922 | 11/1951 | Langenwalter | 73—362 X |
| 2,818,732 | 1/1958 | Bennet | 73—362 |
| 3,087,886 | 4/1963 | Robinson | 73—362 |

LOUIS R. PRINCE, *Primary Examiner.*

D. M. McGIEHAN, *Assistant Examiner.*